United States Patent [19]
Sauerhoefer

[11] Patent Number: 5,482,659
[45] Date of Patent: Jan. 9, 1996

[54] METHOD OF POST PROCESSING STEREOLITHOGRAPHICALLY PRODUCED OBJECTS

[75] Inventor: Marc R. Sauerhoefer, Chicopee, Mass.

[73] Assignee: United Technologies Corporation, Hartford, Conn.

[21] Appl. No.: 363,105

[22] Filed: Dec. 22, 1994

[51] Int. Cl.$^6$ ............................ B29C 35/08; B29C 41/02
[52] U.S. Cl. ........................ 264/401; 264/156; 264/232; 264/233; 264/340; 264/500; 264/572; 264/494; 264/442
[58] Field of Search ................................ 264/22, 23, 156, 264/232, 233, 340, 500, 572

[56] References Cited

U.S. PATENT DOCUMENTS

| 3,083,118 | 3/1963 | Bridgeford | 428/375 |
|---|---|---|---|
| 4,575,330 | 3/1986 | Hull | 425/174.4 |
| 5,143,663 | 9/1992 | Leyden et al. | 264/22 |
| 5,204,055 | 4/1993 | Sachs et al. | 419/2 |
| 5,209,878 | 5/1993 | Smalley et al. | 264/22 |
| 5,248,456 | 9/1993 | Evans, Jr. et al. | 264/22 |
| 5,340,656 | 8/1994 | Sachs et al. | 428/546 |
| 5,345,391 | 9/1994 | Hull et al. | 364/474.24 |

OTHER PUBLICATIONS

"Practical Guide to Quickcast Patterns", 3D Systems, pp. 1–14 (Undated).
"Effects of Humidity on SL 5170 and SL 5180", 3D Systems, J. McQuaid (Undated).

Primary Examiner—Leo B. Tentoni

[57] ABSTRACT

A method of evacuating uncured resin from internal passages of semi-hollow stereolithographically produced objects includes, subjecting the object to air flow for between about 0.5 hours and about 2 hours, at a temperature greater than about 75° F.; externally cleaning the object with alcohol; submerging the object in a bath of alcohol, wherein the bath is internally agitated; removing the object from the bath and repeating the above steps to displace any residual resin, wherein total object exposure time to alcohol does not exceed three hours.

3 Claims, 1 Drawing Sheet

METHOD OF POST PROCESSING STEREOLITHOGRAPHICALLY PRODUCED OBJECTS

TECHNICAL FIELD

The present invention relates generally to post processing stereolithographically produced objects and particularly to a method of evacuating uncured resin from stereolithographically produced semi-hollow objects.

BACKGROUND ART

It is known to produce three-dimensional objects of complex shape by a process known as stereolithography. Stereolithography refers generally to a process which combines the technologies of optical scanning, laser, polymer chemistry and software. U.S. Pat. No. 4,575,330 to Hull, entitled *Apparatus for Production of Three-Dimensional Objects by Stereolithography*, describes stereolithography as a method and apparatus for making solid objects by successively printing thin layers of a curable material, such as a UV curable material, on top of each other. According to the above patent, a programmed movable spot beam of UV light shines on a layer of UV curable liquid and forms a solid cross-section of the object at the surface of the liquid. The cured cross-section is then moved away from the liquid surface by the thickness of one layer. The next cross-section is then formed and adhered to the immediately proceeding layer. This process is repeated to form a three-dimensional object. After the object is formed, the object is removed from the SLA (stereolithography apparatus). The object is then cleaned and post cured.

Semi-hollow objects may also be produced with a SLA. For example, QuickCast™ by 3D Systems, Inc. is a process used on 3D Systems, Inc. SLA rapid prototyping equipment. QuickCast™ as its name implies, was developed to fabricate investment casting patterns. It produces a semi-hollow three dimensional pattern with a honeycomb internal structure. The semi-hollow build style was developed to facilitate drainage of uncured resin from within the internal passages. The internal voids permit the pattern to collapse upon itself as it begins to expand against a mold during investment casting processing.

Post processing of these investment casting patterns involves the formation of multiple drain holes after the pattern is built. The drain holes may also be incorporated during pattern production. The drain holes enable gravity to drain uncured resin from the internal passages.

After gravity draining uncured resin from the pattern, the pattern is removed from the SLA. Several methods may then be employed to rid internal passages of residual, uncured resin. Known methods to remove internal trapped resin include a low speed centrifuging device, nitrogen pressure between 3 psi to 5 psi, and a vacuum. The pattern is then post cured. Post curing typically involves exposure to ultraviolet light.

While the above methods to remove uncured resin from the internal passages of the pattern are useful, a residue of uncured resin within the pattern often results. This residue solidifies during post curing of the object. This uncured resin may result in undesirable object shrinkage or distortion effects during post curing.

In addition, the solidified, uncured resin results in undesirable, additional mass in the object. This additional mass is detrimental to investment casting processing because sufficient voids must exist within the internal passages of the pattern so that it can effectively collapse during processing. The additional mass due to the solidified uncured resin within the internal passages of the pattern fills the voids and hinders the collapsing process.

Accordingly, there is a need for a method of post processing stereolithographically produced semi-hollow objects such that residual, uncured resin is effectively removed from internal passages of the objects.

DISCLOSURE OF INVENTION

According to the present invention, a method of post processing a stereolithographically produced object is disclosed. First, a semi-hollow object is removed from a vat of resin in a stereolithography apparatus. Typically, the object has a honeycomb-like internal structure. Excess resin is then drained from the object by gravity.

Once the external resin is drained from the object, internal resin trapped within the internal passages of the honeycomb structure of the semi-hollow object must be removed. The internal passages of the honeycomb structure are interconnected during the stereolithography build process. This interconnection makes internal resin evacuation possible.

At least two evacuation fitting holes are created in the object to facilitate internal resin removal. At least one air hose is attached to a fitting hole, wherein remaining fitting holes can be capped, except one for resin drainage. The object is subjected to air pressure between about 10 psig and about 40 psig for between about 0.5 hours and about 2 hours. Air flow is redirected, as necessary, by air hose attachment to different fitting holes and possibly uncapping other holes. Temperature of the evacuation process is greater than about 75° F. The air hoses and caps are then removed from the object. The object is then externally cleaned with alcohol.

The object is then submerged in a bath of alcohol which can be internally agitated by ultrasonic motion. Upon removal from the bath, the above steps are repeated until all residual resin is displaced. Total object exposure time to alcohol does not exceed 3 hours.

The object is then internally subjected to air flow until the object is visibly dry. The object is then exposed to ultraviolet light for between about 1 hour and about 2 hours, and is rotated during exposure.

The foregoing and other features and advantages of the present invention will become more apparent from the following description and accompanying drawings.

BEST MODE FOR CARRYING OUT THE INVENTION

While the present invention claims a method of post processing a stereolithographically produced object and does not claim a stereolithography apparatus (SLA), an SLA is described to provide an understanding of the environment in which the object may be produced. See U.S. Pat. No. 4,575,330 to Hull, entitled *Apparatus for Production of Three-Dimensional Objects by Stereolithography*, for a more detailed description of a SLA.

Figure 1:
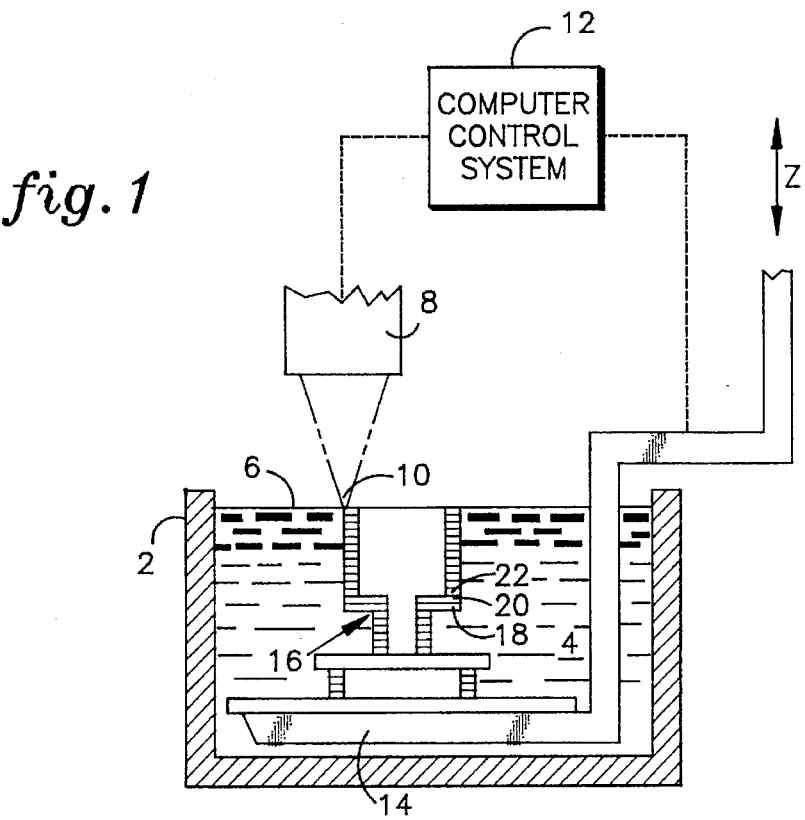
FIG. 1 is a schematic drawing of a stereolithography apparatus (SLA).

As shown in FIG. 1 and as described by Hull in the above referenced patent, a container 2 is filled with a UV curable liquid 4 providing a surface 6. A programmable source of ultraviolet light 8 produces a spot of ultraviolet light 10 in the plane of surface 6. The spot 10 is movable across the surface 6 by the motion of mirrors or other optical or mechanical elements that are a part of light source 8. The position of the spot 10 on surface 6 is controlled by a computer or other programming device 12. A movable elevator platform 14 inside container 2 can be moved up and down selectively. The position of the platform is controlled by the computer 12. The device produces a three-dimensional object 16 by step-wise buildup of integrated laminae such as 18, 20 and 22.

Figure 2:
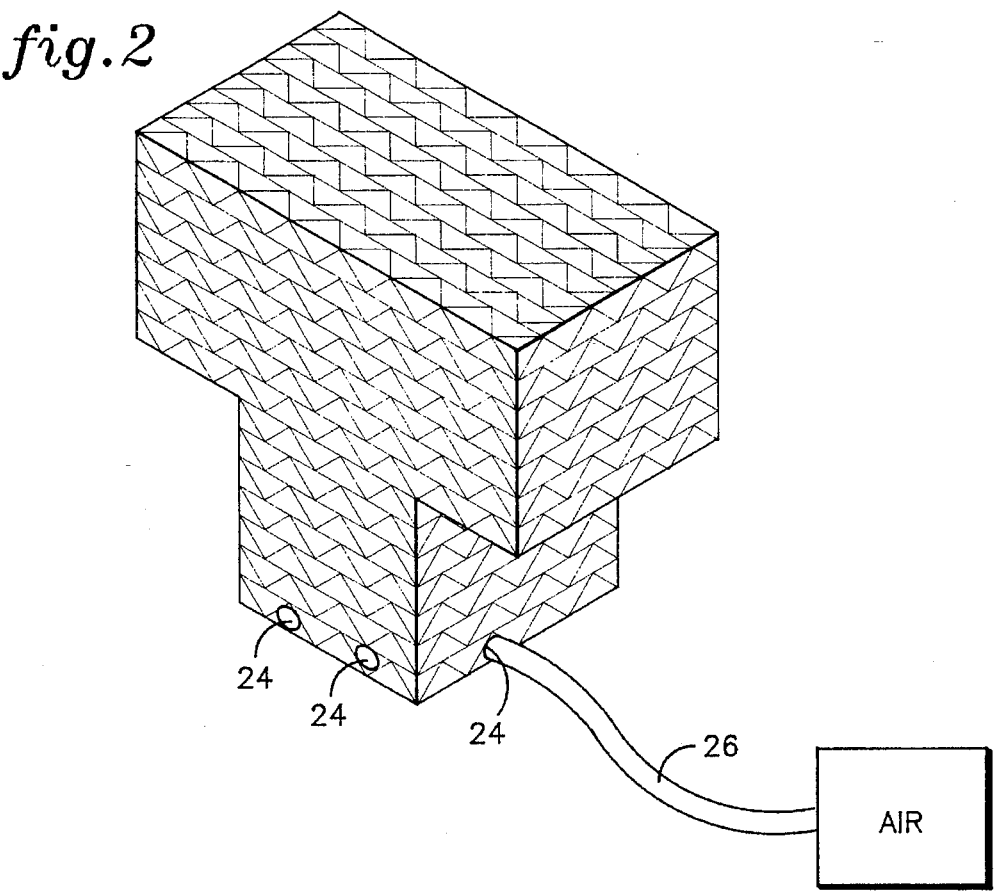
FIG. 2 is a schematic drawing of a three dimensional, semi-hollow stereolithographically produced object with an attached air hose.

According to the present invention, once excess resin is drained from the object 16, which is semi-hollow, at least two evacuation fitting holes 24 are created on the object 16 to facilitate internal resin evacuation, as shown in FIG. 2. The number of fitting holes 24 varies with the size and complexity of the object 16. Larger or more complex objects may require more fitting holes 24 than smaller, less complex objects. These fitting holes 24 may be drilled or they may be built into the object 16 during production.

Once the fitting holes 24 are in place, at least one air hose 26 is attached to a fitting hole. Preferably, the fitting holes 24 as well as a fitting hose attachment is built into the object 16 during production because it is desirous to automate the process as much as possible. Fitting holes 24 not attached to an air hose 26 are capped, except for at least one left open for resin drainage into a recovery apparatus. The object 16 is reoriented, as necessary, to redirect airflow through the various fitting holes 24 and evacuate uncured resin from within the internal passages of the object 16. The object 16 is subjected to air flow between about 10 psig and about 40 psig for between about 0.5 hours and about 2 hours total, at a temperature greater than about 75° F.

When the above evacuation process is complete, the air hose 26 is removed from the object 16, as well as all caps. Resin drained into the recovery apparatus is filtered and recovered. The object 16 is externally cleaned by wiping it with alcohol to avoid excessive contamination of the alcohol bath in which the object 16 is subsequently submerged in.

After the object 16 is externally cleaned, it is submerged in a bath of alcohol, such as isopropyl alcohol. The bath is agitated to facilitate the removal of any remaining traces of resin. Preferably, the bath is ultrasonically agitated.

After about 10 minutes, the object 16 is removed from the bath and the above steps are repeated, if necessary, beginning with subjecting the object 16 to the air flow. This repetition allows all traces of internal trapped resin to be effectively removed. To prevent object 16 deterioration, however, total exposure time to alcohol should not exceed about 3 hours.

Once the object 16 is free of internal resin, it is subjected to air flow, once again, to dry the object 16. The object 16 must be thoroughly dry before it is post cured.

Post curing is accomplished by exposing the object 16 to ultraviolet light for between about 1 hour and about 2 hours. The object 16 is rotated during exposure to facilitate the curing process. After the object 16 is post cured, all holes are typically filled with wax, and any air hose attachments are removed. The pattern is surface finished prior to investment casting processing or other processing.

EXAMPLE

The present invention will now be described by way of example which is meant to be exemplary rather than limiting. A semi-hollow investment casting pattern was produced on a SLA using the QuickCast™ process and a SL5170 resin system. The pattern was raised in the SLA by an elevator platform and excess, external resin drained back into the vat from which the pattern was created. After about 15 minutes, the pattern was transferred to a drain pan and placed on a resin recovery drain cart.

While the pattern was on the drain cart, 4 fitting drain holes were hand drilled into the pattern. One air hose was attached to a fitting hole, while the remaining fittings holes were capped except one for resin drainage into the pan. A main feed valve, regulated at 30 psig was opened and air flowed into the pattern until bulk fluid was visibly drained, but not longer than 1 hour at greater than 60%RH or greater than 75° F. (shop environment).

The part was reoriented, as required, and the air hoses were attached to the remaining fitting holes, as required for complete resin removal. The unattached fitting holes were capped to redirect the flow. One fitting hole remained uncapped for resin drainage. The flow characteristics were observed for trapped volumes of resin which would indicate that the airflow needed to be redirected. The resin collected in the pan was reclaimed by filtering.

The pattern was then placed back on the drain pan and externally swabbed with isopropyl alcohol. This bulk cleaning deterred contamination of a large bath of isopropyl alcohol in which the pattern was subsequently submerged in. Next the pattern was fully submerged in the alcohol bath for 10 minutes. The bath was agitated internally. The pattern was then removed from the alcohol bath and shaken. The above process was repeated. Total pattern exposure to alcohol did not exceed 3 hours.

The pattern was then dried. Air hoses were once again attached (unused fitting holes capped, except one for alcohol drainage). Air flow pressure was about 30 psig. The pattern was fully purged until it was dry. The flow was redirected, as necessary, by attaching the air hoses to different fitting holes and capping different fitting holes.

After the pattern was fully dried, which took about 1 hour, the pattern was placed in a post curing apparatus. In the post curing apparatus, the pattern was exposed to ultraviolet light for 1.5 hours and rotated during exposure on a rotating platform. After post curing, the pattern was inspected. No trapped resin within the internal passages of the pattern was visible, nor was any deterioration observed.

An advantage of the present invention is the ability to yield more consistent, durable and stable patterns than conventional processing techniques. Patterns processed according to the present invention show a reduction in mass due to the effective removal of uncured resin from remote thin sections of three dimensional objects. This reduction in mass is beneficial to investment casting processing of the semi-hollow pans because necessary voids for collapse of the patterns are provided, as well as less mass to expand against the mold. Thus, mold cracking is significantly reduced.

Yet other advantages of the present invention include the low cost of operation due to the use of air. There is also a reduction in post processing time from several days to several hours.

Although the invention has been shown and described with respect to detailed embodiments thereof, it should be understood by those skilled in the art that various changes in form and detail may be made without departing from the spirit and scope of the invention.

I claim:

1. A method of post processing stereolithographically produced semi-hollow objects comprising the steps of:

(a) creating at least two fitting holes in the object to facilitate internal resin evacuation;

(b) attaching at least one air hose to a fitting hole wherein remaining fitting holes are capped, except at least one fitting hole remains open for resin drainage;

(c) subjecting the object to air flow for between about 0.5 hours and about 2 hours, at a temperature greater than about 75° F.;

(d) removing any air hoses and then externally cleaning the object with alcohol;

(e) removing any caps and submerging the object in a bath of alcohol, wherein the bath is internally agitated; and (f) removing the object from the bath and repeating steps (b) through (e) to displace residual resin, wherein total object exposure time to alcohol does not exceed 3 hours.

2. The method of claim 1 wherein the alcohol is isopropyl alcohol.

3. A method of evacuating uncured resin from internal passages of a stereolithographically produced semi-hollow object comprising the steps of:

(a) creating at least two fitting holes in the object to facilitate internal resin evacuation;

(b) subjecting the object to air flow such that resin drains from the internal passages, wherein at least one air hose is attached to a fitting hole and remaining fitting holes are capped, except at least on fitting hole remains open for resin drainage;

(c) removing any air hoses and then externally cleaning the object with alcohol;

(d) removing any caps and submerging the object in a bath of alcohol, and (e) removing the object from the bath and repeating steps (b) through (d) to displace residual resin, wherein total object exposure time to alcohol does not exceed 3 hours.

* * * * *